W. E. BOLES.
RIM LUG.
APPLICATION FILED APR. 5, 1920.

1,365,582.

Patented Jan. 11, 1921.

INVENTOR
WILEY E. BOLES.

BY
Carey S. Frye
ATTORNEY

UNITED STATES PATENT OFFICE.

WILEY E. BOLES, OF INDIANAPOLIS, INDIANA, ASSIGNOR TO GEORGE RISER, OF INDIANAPOLIS, INDIANA.

RIM-LUG.

1,365,582.  Specification of Letters Patent.  Patented Jan. 11, 1921.

Application filed April 5, 1920. Serial No. 371,563.

*To all whom it may concern:*

Be it known that I, WILEY E. BOLES, a citizen of the United States, residing at Indianapolis, in the county of Marion and State of Indiana, have invented new and useful Improvements in Rim-Lugs, of which the following is a specification.

This invention relates to rim lugs of that class adapted primarily for securing a demountable rim to a vehicle wheel and the prime feature of the invention is the provision of a two part lug structure so arranged that one part may be adjusted with respect to the other part so that it may be entered between the felly and rim of the wheel any desired distance.

A further feature of the invention is the provision of means for holding the two parts of the lug structure in adjusted relation with each other when the lug structure is applied to use, said adjustments to be made from time to time as the parts with which the lug structure coöperates become worn and thus eliminating any squeaky or rattling noises.

A further feature of the invention is in so constructing the two parts of the lug structure that one part may be moved laterally with respect to the other part, but will be held against longitudinal movement independently of each other.

Other objects and advantages will be hereinafter more fully set forth and pointed out in the accompanying specification.

In the accompanying drawings which are made a part of this application,

Figure 1:
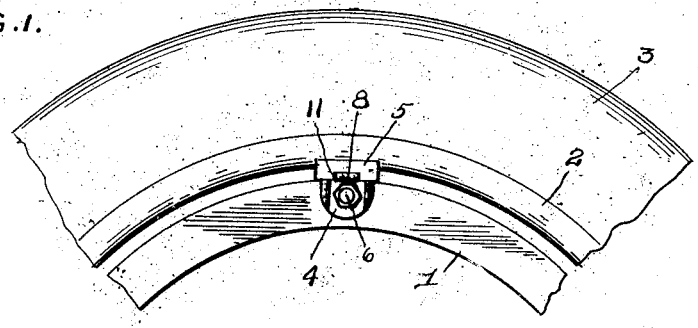
Figure 1 is an elevation of a portion of a wheel structure with a lug attached thereto.
Figure 2:
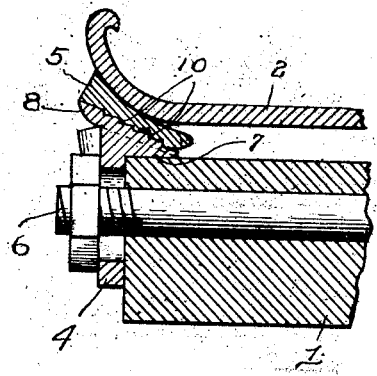
Fig. 2 is an enlarged transverse central sectional view through the lug and the parts to which it is attached.
Figure 3:
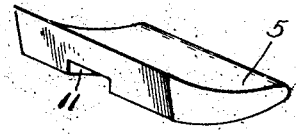
Fig. 3 is a perspective view of the upper portion of the lug structure.
Figure 4:
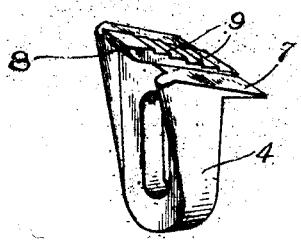
Fig. 4 is a perspective view of the lower portion of the lug structure.

Referring to the drawings, 1 indicates a wheel felly, 2 indicates a rim of the demountable type and 3 indicates a tire, all of which parts may be of the usual or any preferred type. In attaching demountable rims to wheels of this class lugs are employed, but after the wheel has been used for some time, the parts thereof engaged by the lugs become worn to such an extent as to cause the wheel to give off a squeaking noise as well as permitting movement of the tire and rim independently of the felly of the wheel.

To overcome these objectionable features, the lug structure herein shown is formed in two parts, a lug proper 4 and a wedge plate 5, the plate 5 entering between the felly 1 and the rim 2 while the lug 4 is secured to the felly by a bolt 6.

The upper end of the lug 4 is provided with a laterally extending flange 7 upon which rests the under face of the plate 5, the lug 4 having an upwardly and transversely extending rib 8, the upper face of which is stepped to form shoulders 9 which engage opposed shoulders 10 on the plate 5, the under face of the plate having a transverse recess 11 in which the shoulders 10 are located, the side walls of the recess 11 engaging the side walls of the rib and holding said plate against longitudinal movement with respect to the lug.

As the parts of the lug structure become loosened by wear or otherwise, the plate is moved inwardly on the lug 4 one or more notches and the lug again tightened against the face of the felly, thus moving the plate further inwardly between the rim and felly than previously, and as the plate is somewhat tapered, this extra inward movement compensates for any wear or expansion of the parts of the wheel and maintains the rim taut around the felly.

This operation may be repeated from time to time thus guarding against any squeaking or rattling noises being made as frequently occurs with the use of the ordinary lug, from the fact that when the ordinary lug is forced against the face of the felly, there is no means for further tightening the wheel rim.

It will further be seen that by entering the rib 8 in the recess 11, the plate 5 will be held against longitudinal movement above the lug 4, consequently the plate will not become lost should the lug become slightly loosened from the felly.

In operation, the wedge plate 5 is properly positioned above the lug 4 and the lug then tightened against the face of the felly 1. Should the wedge become loose by wear or expansion of the rim, the lug 4 is to be slightly loosened and the wedge moved inwardly a sufficient distance that when the lug is again tightened, the wedge will firmly engage the rim and take up such wear or expansion.

The invention claimed is:

1. A rim lug construction including a lug proper, a wedge plate separate from the lug, the under face of said plate having a recess, shoulders in said recess, the under face of said plate on opposite sides of said recess being smooth, a rib on said lug adapted to enter said recess, and shoulders on said rib adapted to engage the shoulders in the recess and hold the plate in various adjusted positions, the upper face of said lug on opposite sides of said ribs being smooth for receiving the smooth under face of said plate.

2. The combination with a wheel felly and a rim surrounding and spaced from the felly, of a lug construction for holding the rim in spaced relation to the felly comprising a lug, means for clamping the lug against the felly, an upwardly and transversely extending rib at the medial line of the upper face of the lug, stepped shoulders on the upper face of said rib, a wedge plate adapted to enter between the felly and rim, said plate having a transversely extending recess in its under face at its longitudinal center for the reception of said rib, and means on the meeting faces of said rib and recess for adjusting said plate laterally of the lug for causing the plate to enter between the felly and rim varying distances.

In testimony whereof I hereto affix my signature.

WILEY E. BOLES.